United States Patent [19]
Spencer

[11] Patent Number: 5,332,499
[45] Date of Patent: Jul. 26, 1994

[54] SELF-CLEANING FILTER

[76] Inventor: Glenn E. Spencer, Box 8204 Hwy. 403, Charlestown, Ind. 47111

[21] Appl. No.: 967,401

[22] Filed: Oct. 28, 1992

[51] Int. Cl.$^5$ .............................................. B01D 33/00
[52] U.S. Cl. .................................... 210/396; 210/397; 210/402
[58] Field of Search ................ 210/396, 397, 402, 422, 210/408, 409, 415

[56] References Cited

U.S. PATENT DOCUMENTS

| 2,008,598 | 2/1935 | Seeley | 210/167 |
|---|---|---|---|
| 2,009,382 | 7/1935 | Blaufuss | 210/201 |
| 3,286,843 | 8/1965 | Kraissl, Jr. | 210/332 |
| 3,712,031 | 1/1973 | Santa Cruz | 55/232 |
| 4,153,436 | 5/1979 | Cozine et al. | 55/290 |
| 4,957,630 | 9/1990 | Bratten | 210/358 |
| 4,966,700 | 10/1990 | Pall | 210/386 |
| 4,997,575 | 3/1991 | Hultsch | 210/741 |
| 5,026,487 | 6/1991 | Abdulmassih | 210/791 |
| 5,051,195 | 9/1991 | Haapamäki et al. | 210/396 |
| 5,087,365 | 2/1992 | Davis et al. | 210/409 |

FOREIGN PATENT DOCUMENTS

| 0494800 | 7/1992 | European Pat. Off. | 210/396 |
|---|---|---|---|
| 0026114 | 2/1984 | Japan | 210/396 |
| 675546 A5 | 10/1990 | Switzerland . | |
| 0998362 | 2/1983 | U.S.S.R. | 210/396 |

Primary Examiner—Virginia Manoharan
Attorney, Agent, or Firm—Jones & Askew

[57] ABSTRACT

A self-cleaning filter includes two cleaning blades spaced from about 75° to about 115° about the circumference of a rotatable tubular filter screen. The tubular filter screen is rotated relative to the two cleaning blades whereby particles in the slurry being filtered having a size less than a predetermined size are forced through the tubular filter screen and particles having a size not less than the predetermined size are removed from the exterior surface of the filter screen and then removed from the filter. The self-cleaning filter is particularly suited for filtering slurries in which solid particles tend to agglomerate.

8 Claims, 3 Drawing Sheets

SELF-CLEANING FILTER

TECHNICAL FIELD

This invention relates to filter devices, and particularly relates to self-cleaning filter devices.

BACKGROUND OF THE INVENTION

Generally, filtration involves the removal of particulate matter from a fluid. There are a multitude of known designs for filtration devices. A basic filtration device generally includes a conduit for conducting a fluid material and a screen fitted into the conduit so that the material must pass through the screen to continue flowing. Fluid and particles having a size smaller than the holes in the screen pass through the screen while the larger particles are collected on the side of the screen facing the flow of the material.

The layer particles, also called contaminants, collected on the filter screen must be removed before the filter screen becomes clogged and material flow through the filter screen is undesirably inhibited. One method of removing contaminants from a filter screen is to remove the filter screen from the filter and clean the filter screen. This process is adequate for many applications, but often undesirable for continuous processes. In a continuous process, the process must be stopped to remove and clean a filter screen or the filter screen must be by-passed through a second filter. Stopping the process to replace the filter screen slows production and increases operating costs and providing a by-pass filter increases capital costs.

In an effort to solve the foregoing problems, self-cleaning filters were developed. Self-cleaning filters include brushes or blades which continuously or periodically remove contaminants from the filter screen. Typically, the contaminants which are removed eventually flow downwardly along the filter screen and settle at the bottom of the filter unit. The contaminants are then removed by a suitable drain.

U.S. Pat. No. 3,286,843 discloses a self-cleaning filter including a tubular filter screen disposed in a casing and diametrically opposed cleaning brushes positioned against the exterior of the filter screen. The bristles of the brush remove contaminants from the filter screen and the removed contaminants are discharged from the lower end of the casing. Although the filter disclosed in that patent is effective in certain applications, such a filter is undesirable in other applications. For example, when filtering a slurry containing particles which tend to agglomerate, agglomerates containing both contaminants and material meant to pass through the filter screen are collected by the filter screen. In such a situation, it is desirable to force the smaller particles through the screen and remove the contaminants from the screen. However, with brushes such as are disclosed in U.S. Pat. No. 3,286,843, agglomerates of solid particles tend to pass through the brushes or collect in the brushes.

Cleaning blades are more effective to filter slurries with agglomerated solid particles. U.S. Pat. Nos. 2,008,598 and 4,957,630 both disclose self-cleaning filters which include a tubular filter screen disposed in a casing and a cleaning blade which is urged against the filter screen to remove contaminants from the surface of the filter screen. Although blades are more effective than brushes in handling slurries with agglomerated solid particles, conventional self-cleaning filters which include a cleaning blade tend to remove agglomerates from the surface of the filter screen, but do not adequately break up the agglomerates and force the smaller particle size material through the screen. Instead, the cleaning blade removes the agglomerates and entire agglomerates are collected at the bottom of the filter and removed from the casing. This results in a substantial loss of valuable material. Therefore, there is a need for a self-cleaning filter which filters slurries having agglomerated solid particles without substantial loss of solid particles which are meant to pass through the filter screen.

SUMMARY OF THE INVENTION

Accordingly, an object of the present invention is to provide an improved self-cleaning filter.

Another object of the present invention is to provide an improved self-cleaning filter for filtering slurries having agglomerates of solid particles.

This invention fulfills these and other objects by providing a self-cleaning filter comprising two cleaning blades. The first cleaning blade is positioned to remove agglomerates of solid particles from the exterior surface of a filter screen and break-up some of the agglomerates. The first cleaning blade forces through the filter screen a portion of the solid particles meant to pass through the filter screen. The remaining agglomerates pass over the first cleaning blade to a second blade positioned so as to catch the agglomerates removed by the first cleaning blade and further break-up the agglomerates, forcing through the filter screen more of the solid particles meant to pass through the filter screen and suspending the solid particles too large to pass through the filter screen in the slurry. The larger particles eventually fall downwardly by the filter screen and are withdrawn through the lower end of the filter. By the use of two cleaning blades, the present invention filters slurries having agglomerated solid particles without the loss of substantial quantities of solid particles meant to pass through the filter screen. Thus, the present invention saves on operating costs and is more efficient.

Stated more particularly, the self-cleaning filter of the present is suitable for removing solid particles having a size not less than a predetermined size and comprises a casing, a tubular filter screen disposed in the casing, first and second cleaning blades, and a device for rotating the tubular filter screen. The casing has an inlet for receiving material to be filtered and an outlet for discharging filter material. The tubular filter screen is disposed in the case and has an exterior surface and an interior surface. The tubular filter screen forms an inlet chamber between the casing and the exterior surface of the tubular filter screen in flow communication with the casing inlet. The tubular filter screen also forms an outlet chamber within the interior surface of the tubular filter screen in flow communication with the casing outlet. Thus, the slurry is filtered from the exterior surface of tubular filter screen to the interior surface. The first cleaning blade is disposed in the inlet chamber and is removably fixed to the casing. In addition, the first cleaning blade is biased against the exterior surface of the filter screen and extends along the length of the filter screen. Likewise, the second cleaning blade is disposed in the inlet chamber and is removably fixed to the casing. The second cleaning blade is also biased against the exterior surface of the filter screen. The second cleaning blade is spaced from the first cleaning blade about the circumference of the tubular filter screen and extends along the length of the filter screen from about 75° to about 115° from the first cleaning blade. The rotating device rotates the tubular filter screen relative to the first and second cleaning blades whereby particles in the slurry having the size less than the predetermined size are forced through the tubular filter screen and particles having a size not less than the predetermined size are removed from the exterior surface of the filter screen.

Stated even more particularly, the self-cleaning filter of the present invention can include a reservoir for collecting the particles removed by the first and second cleaning blades and a device for discharging the particles collected in the reservoir. In addition, the self-cleaning filter of the present invention can further include a coupling connected to the casing for connecting the filter to slurry inlet and outlet conduits in a process line.

The device for rotating the filter screen of the present invention can include a drive shaft extending through the coupling to the tubular filter screen and a double mechanical seal mounted in the coupling through which the drive shaft extends. In a preferred embodiment, the self-cleaning filter of the present invention returns slurry which leaks around the double mechanical seal to the inlet chamber of the casing to prevent leakage from the filter. Still further, the device for rotating the tubular filter screen may further include a gear reducer so that standard motors may be used to power the filter.

The tubular filter screen of the present invention has openings which expand from the exterior surface of the filter screen to the interior surface to prevent blockage of the filter screen openings. Still more particularly, the tubular filter screen includes wedge-shaped rods connected by rings, the wedge-shaped rods having a width which decreases from the exterior surface of the tubular filter screen to the interior surface. The wedge-shaped rods and rings form the expanded openings in the filter rings.

Preferably, the first and second cleaning blades of the present invention each have a leading edge biased against the exterior surface of the tubular filter screen and extend from respective first and second blade holders toward the leading edges in a direction substantially opposing the direction of rotation of the tubular filter screen.

The nature of the present invention, as well as other objects and advantages thereof, will become more readily apparent from the following description of the preferred embodiment.

DETAILED DESCRIPTION

Figure 1:
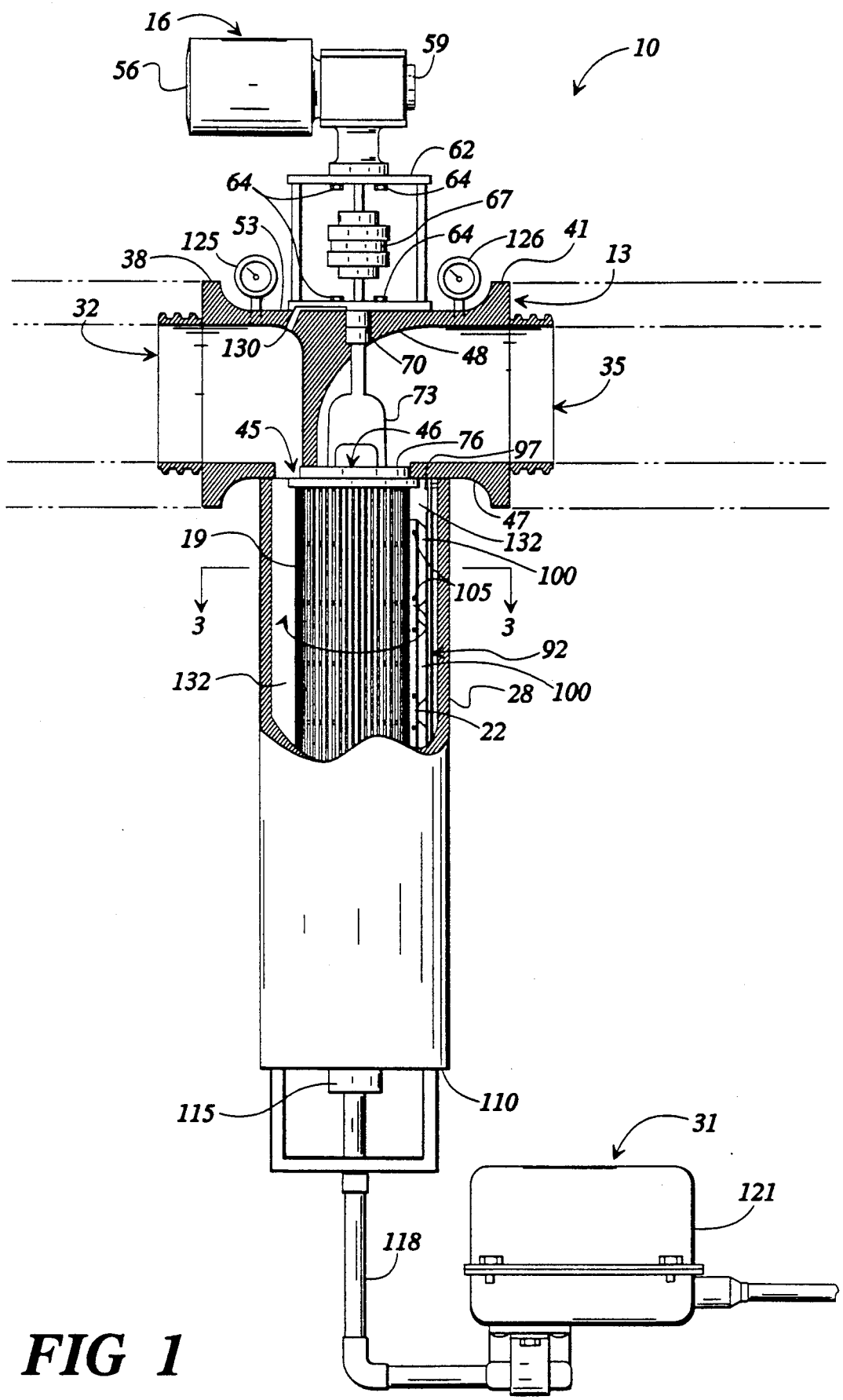
FIG. 1 is a partial, perspective view of a self-cleaning filter made according to a preferred embodiment of the present invention with a portion of the filter interior exposed.
Figure 2:
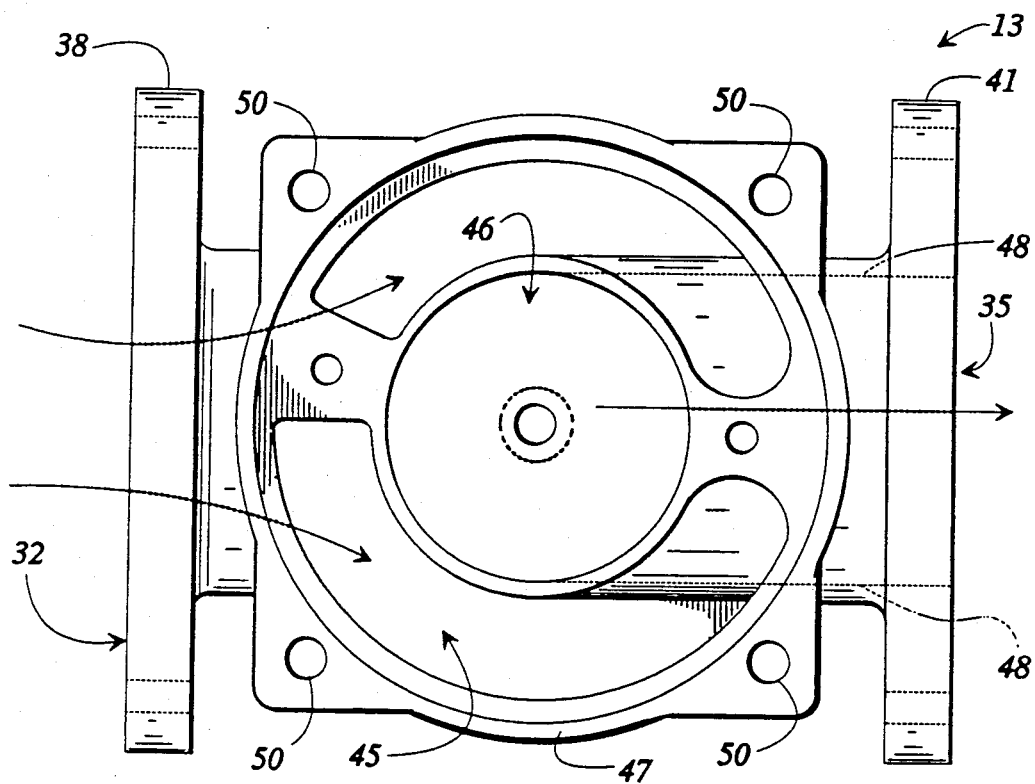
FIG. 2 is a plan view of the filter side of a coupling which forms part of the filter apparatus shown in FIG. 1.
Figure 3:
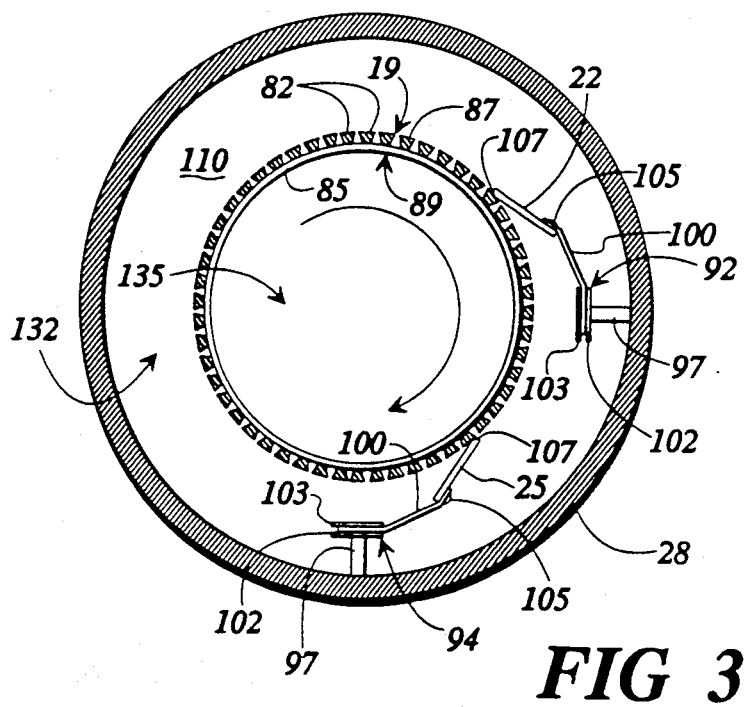
FIG. 3 is a cross-sectional partial plan view of the filter apparatus shown in FIG. 1.
Figure 4:
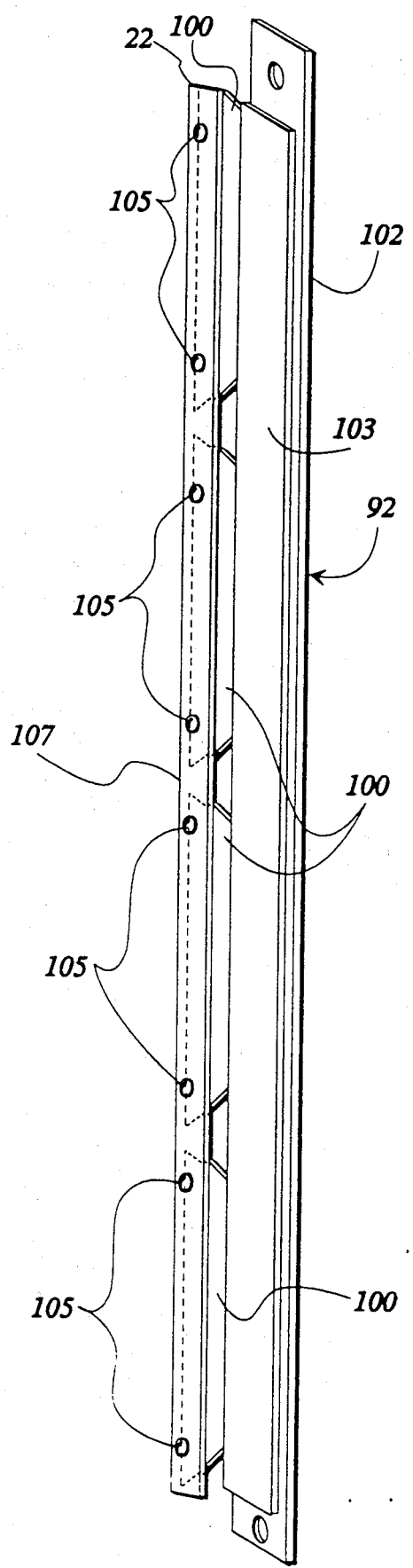
FIG. 4 is a perspective view of a cleaning blade which is part of the filter apparatus shown in FIG. 1.

Turning to FIGS. 1 and 3, a self-cleaning filter apparatus 10 is shown and generally comprises a coupling 13 for connecting the filter apparatus to a process line 14, a motor assembly 16, a rotatable tubular filter screen 19, first and second cleaning blades 22 and 25, a casing 28 housing the tubular filter screen and cleaning blades, and a drain system 31 for removing contaminants from the lower end of the filter apparatus. During operation, material to be filtered enters the casing 28 through the coupling 13 and is filtered by the tubular filter screen 19 while the tubular filter screen is rotated by the motor assembly 16. As the tubular filter screen rotates, the cleaning blades 22 and 25 break up agglomerates collected on the filter screen, force particles having a smaller particle size through the filter screen, and remove larger particles from the filter screen. The larger particles eventually collect at the lower end of the casing 28 and are removed from the casing by the drain system 31. Filtered material exits the filter apparatus 10 through the coupling 13.

The coupling 13 forms discrete inlet and outlet passages 32 and 35 for receiving material to be filtered and discharging filtered material, respectively. The inlet passage 32 extends from one flange 38 and the outlet passage 35 extends from an opposite flange 41 inwardly and downwardly through the coupling 13 to respective concentric openings 45 and 46 in the filter side 47 of the coupling. The outer opening 45 forms an outlet for receiving material to be filtered and the inner opening 46 forms an outlet for filtered material to exit the filter apparatus 10. The concentric openings 45 and 46 are separated by an outlet passage conduit 48 extending from the center of the filter side 47 of the coupling toward the opposite flange 41. Bolts 50 extend from the filter side 47 of the coupling 13 and are used to mounted the filter casing 28.

The motor assembly 16 is mounted to the top 53 of the coupling 13 opposite the filter side 47 of the coupling. The motor assembly 16 includes a motor 56 such as an electric or air motor connected at a right angle to a gear reducer 59. The gear reducer 59 is mounted on a bracket which is mounted to the top 53 of the coupling 13. The bracket 62 is connected to the gear reducer 59 and the coupling 13 with bolts 64. A drive shaft 66 extends from the gear reducer 59, through the top bracket 62, through a double mechanical seal 70 mounted in the coupling 13, to a Y-shaped connector 73 in the outlet passage 35 of the coupling. The motor 56 rotates the drive shaft 67 through the gear reducer 59 and the drive shaft rotates the Y-shaped connector 73 which in turn rotates the tubular filter screen 19.

The Y-shaped connector 73 connects to a rotatably mounted top filter bracket 76. The tubular filter screen 19 extends from the top filter bracket 76 to a bottom filter bracket which is not shown. The top filter bracket 76 fits sealingly into the outlet opening 46 in the filter side 47 of the coupling 13 and creates a seal between the material entering through the inlet passage 32 and the material exiting through the outlet passage 35. Filtered material exits through a central opening (not shown) in the top filter bracket 76.

The tubular filter screen 19 preferably comprises a plurality of wedge-shaped rods 82 spaced from one another and extending along the length of the tubular filter screen. The rods 82 are connected by a plurality of spaced rings 84 positioned at series from one end of the tubular filter screen 19 to the other. The wedge-shaped rods 82 form the exterior surface 87 of the tubular filter screen 19 and the rings 85 form the interior surface 89 of the tubular filter screen. The wedge-shaped rods 82 taper inwardly from the exterior surface 87 of the tubular filter screen 19 towards the interior surface 89. In other words, the width of the wedge-shaped rods 82 decreases from the exterior surface 87 to the interior surface 89. Thus, the openings between the wedge-shaped rods 82 and the rings 85 expand from the exterior surface 87 towards the interior surface 89. Because the holes in the tubular filter screen expand from the exterior surface 87 to the interior surface 89, particulate material can pass more easily through the filter screen 19.

The tubular filter casing 28 extends from the filter side 47 of the coupling 13 and encases the tubular filter screen 19 which is disposed in the casing. The tubular filter casing 28 is mounted to the coupling 13 with the bolts 50 extending from the filter side 47 of the coupling.

The first and second cleaning blades 22 and 25 are disposed in the filter casing 28 and are fixed to the interior of the filter casing with respective blade holders 92 and 94 which are connected to the filter casing with bolts 97 extending from the interior surface of the filter casing. The blade holders 92 and 94 each comprise a plurality of metal springs 100 welded between two elongate rods 102 and 103. The metal springs 100 are angled toward to the exterior surface 87 of the tubular filter screen 19 and the cleaning blades 22 and 25 are mounted to the forward ends of the metal springs 100 with bolts 105. The first and second cleaning blades 22 and 25 have leading edges 107 which are biased against the exterior surface of the tubular filter screen 19 by the metal springs 100.

The first and second cleaning blades 22 and 25 extend along the length of the tubular filter screen 19 from the top filter bracket 76 to the bottom filter bracket and are angled towards to exterior surface 87 of the tubular filter screen in a direction substantially opposing the direction of rotation of the tubular filter screen. In other words, the leading edges 107 of the filter blades 22 and 25 are directed against the grain of the rotating tubular filter screen 19.

The first and second cleaning blades 22 and 25 are spaced from one another about the circumference of the tubular filter screen 19, and preferably, the leading edges 107 of the respective first and second cleaning blades are spaced from about 75° to about 115° about the circumference of the tubular filter screen. In the preferred embodiment shown in FIG. 3, the first and second cleaning blades are positioned 90° from one another about the circumference of the tubular filter screen 19. When the first and second cleaning blades 22 and 25 are positioned between 75° and 115° apart, the second cleaning blade catches agglomerates of solid particles removed, but not broken up, by the first cleaning blade, and breaks up those agglomerates, forcing through the tubular filter screen 19 particles which are meant to pass through the tubular filter screen and suspending in the slurry larger particles not meant to pass through the tubular filter screen, so that the larger particles eventually settle through the slurry to the bottom 110 of the filter casing 28. The larger, settled particles are then removed from the casing. When the first and second cleaning blades 22 and 25 are positioned less than about 75° apart, the agglomerates of solid particles not broken up by the first cleaning blade tend to pass over the second cleaning blade and then settle at the bottom of the filter casing 28 where such agglomerates are removed from the casing. This results in a loss of valuable material meant to be passed through the filter. When the first and second cleaning blades 22 and 25 are spaced apart more than about 115°, the agglomerates of solid particles removed but not broken up by the first cleaning blade tend to settle out without being caught by the second cleaning blade. Likewise, this also results in a loss of valuable material with contaminants.

The tubular filter screen 19 is preferably fabricated with stainless steel and the first and second cleaning blades 22 and 25 are preferably fabricated with polytetrafluoroethylene (TEFLON), but it should be understood that other materials known to those skilled in the art may be used to make both the tubular filter screen and the cleaning blades. Preferably, however, the tubular filter screen 19 and the cleaning blades 22 and 25 are made of materials such that the cleaning blades do not rapidly wear the tubular filter screen during operation.

A drain 115 in the bottom 110 of the filter casing 28 removes contaminants from the filter casing. The contaminants can be drained from the bottom 110 of the filter casing 28 through a drain line 118 by opening a valve 121 connected to the drain line. Preferably, a programmable draining ball valve is used to periodically drain the contaminants from the bottom 110 of the filter casing 28.

In the preferred embodiment, pressure gauges 125 and 126 can be mounted to the coupling 13 to monitor the pressures in the inlet passage 32 and the outlet passage 35. In addition, to prevent the leakage of filtered material around the double mechanical seal 70, a passageway 130 may be formed in the lower portion of the motor bracket 62 and the coupling 13. The passageway 130 extends from the double mechanical seal 70 to the inlet passage 32 and returns any material which leaks around the double mechanical seal to the incoming material stream.

During operation of the filter apparatus 10, material to be filtered flows through the inlet passage 32 of the coupling 13, through the inlet opening 46 in the filter side 47 of the coupling, and into an inlet chamber 132 formed between the interior of the casing 28 and the exterior surface 87 of the tubular filter screen 19. The tubular filter screen 19 has holes which are sized to prevent passage of solid particles having not less than a predetermined size through the tubular filter screen. Liquid and solid particles having a particle size less than the predetermined size pass through the holes in tubular filter screen 19 into an outlet chamber 135 formed within the interior surface 89 of the tubular filter screen. The filtered material then passes from the outlet chamber 135, through the outlet passage 35 and the coupling 13, and returns to the process line 14.

Solid particles having a size not less than the predetermined size and agglomerates of particles of all sizes collect on the exterior surface 87 of the tubular filter screen 19 and block the passage of material through the tubular filter screen. As explained above, the first and second cleaning blades 22 and 25 break up such agglomerates and suspend the solid particles having a size not less than the predetermined size in the slurry. The motor 56, through the gear reducer 59, the drive shaft 67, and the Y-shaped connector 73, rotates the tubular filter screen 19, and, as the tubular filter rotates, the first cleaning blade 22 breaks up some of the agglomerates on the exterior surface 87 of the tubular filter screen 19 and forces some of the solid particles having a size less than the predetermined size through the tubular filter screen while suspending some of the particles having a size not less than the predetermined size in the slurry. However, as explained above, some of the agglomerates are not broken up by the first cleaning blade 22 but are suspended in the slurry. The agglomerates not broken up by the fist cleaning blade 22 are pulled back towards the exterior surface 87 of the filter screen 19 and are broken up by the second cleaning blade 25. Like the first cleaning blade 22, the second cleaning blade 25 forces the particles having a size less than the predetermined size through the tubular filter screen 19 and suspends the particles having a size not less than the predetermined size in the slurry. The larger particles then settle to the bottom 110 of the filter casing 28 and are removed through the drain 115.

It should be understood that the foregoing relates only to preferred embodiments of the present invention, and that numerous changes and modifications may be made therein without departing from the spirit and scope of the invention as defined in the following claims.

I claim:

1. A self-cleaning filter for removing solid particles from a liquid slurry comprising agglomerates of solid particles, the self-cleaning filter comprising:

a casing having an inlet for receiving material to be filtered and an outlet for discharging filtered material;

a tubular filter screen disposed in the casing and having a length, a circumference, an exterior surface and an interior surface, the tubular filter screen being rotatable in a direction and forming an inlet chamber between the casing and the exterior surface in flow communication with the casing inlet and an outlet chamber within the interior surface in flow communication with the casing outlet, so that the slurry is filtered from the exterior surface of the tubular filter screen to the interior surface;

first means for breaking-up a first portion of agglomerates deposited on the exterior surface of the tubular filter screen, forcing a first portion of the solid particles through the tubular filter screen, and suspending in the slurry a second portion of agglomerates deposited on the tubular filter screen, the first means comprising a first cleaning blade disposed in the inlet chamber and removably fixed to the casing, the first cleaning blade (1) having a leading edge biased against the exterior surface of the filter screen, (2) extending from a first blade holder toward the leading edge of the, first cleaning blade in a direction substantially opposing the direction of rotation of the tubular filter screen, and (3) extending along the length of the filter screen;

a second means for catching and breaking-up the second portion of agglomerates and forcing a second portion of solid particles through the tubular filter screen, the second means comprising a second cleaning blade disposed in the inlet chamber and removably fixed to the casing, the second cleaning blade (1) having a leading edge biased against the exterior surface of the filter screen, (2) extending from a second blade holder toward the leading edge of the second cleaning blade in a direction substantially opposing the direction of rotation of the tubular filter screen, and (3) extending along the length of the filter screen, the second cleaning blade being spaced from the first cleaning blade at a position about the circumference of the tubular filter screen from about 75° to about 115° from the first cleaning blade; and means for rotating the tubular filter screen relative to the first and second cleaning blades.

2. A self-cleaning filter as in claim 1 wherein the casing comprises a reservoir for collecting the particles removed by the first and second cleaning blades and the filter comprises means for discharging the particles collected by the reservoir from the casing.

3. A self-cleaning filter as in claim 1 further comprising a coupling connected to the casing for connecting the filter to slurry inlet and outlet conduits.

4. A self-cleaning filter as in claim 3 wherein the rotating means comprises a drive shaft extending through the coupling to the tubular filter screen and a double mechanical seal mounting in the coupling through which the drive shaft extends.

5. A self-cleaning filter as in claim 4 further comprising means for returning any slurry which leaks around the double mechanical seal to the inlet chamber of the casing.

6. A self-cleaning filter as in claim 1 wherein the rotating means comprises a gear reducer.

7. A self-cleaning filter as in claim 1 wherein the tubular filter screen has openings which expand from the exterior surface of the filter screen to the interior surface.

8. A self-cleaning filter as in claim 7 wherein the tubular filter screen comprises wedge-shaped rods connected by rings, the wedge-shaped rods having a width which decreases from the exterior surface of the tubular filter screen to the interior surface.

* * * * *